United States Patent
Moughabghab et al.

(10) Patent No.: US 7,440,525 B2
(45) Date of Patent: Oct. 21, 2008

(54) DYNAMIC RANGE SIGNAL TO NOISE OPTIMIZATION SYSTEM AND METHOD FOR RECEIVER

(75) Inventors: Raed Moughabghab, Laguna Niguel, CA (US); Najwa Moughabghab, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 818 days.

(21) Appl. No.: 10/929,053

(22) Filed: Aug. 27, 2004

(65) Prior Publication Data

US 2006/0045217 A1 Mar. 2, 2006

(51) Int. Cl.
*H04L 27/08* (2006.01)
(52) U.S. Cl. .................. 375/345; 375/344; 375/232
(58) Field of Classification Search .................. 375/232, 375/345; 327/130; 359/341.1; 385/24; 700/94
See application file for complete search history.

(56) References Cited

U.S. PATENT DOCUMENTS

| | | | | |
|---|---|---|---|---|
| 4,885,792 A | * | 12/1989 | Christensen et al. | ........ 381/119 |
| 5,293,405 A | * | 3/1994 | Gersbach et al. | ............ 375/232 |
| 6,396,624 B1 | * | 5/2002 | Nissov et al. | ............ 359/341.1 |
| 6,577,788 B1 | * | 6/2003 | Eiselt et al. | .................... 385/24 |
| 6,744,330 B1 | * | 6/2004 | Jones et al. | ................ 333/28 R |
| 7,005,901 B1 | * | 2/2006 | Jiang et al. | .................. 327/130 |
| 2004/0172148 A1 | * | 9/2004 | Horibe | ........................ 700/94 |
| 2005/0254368 A1 | * | 11/2005 | Liang et al. | ................ 369/47.1 |
| 2006/0045176 A1 | * | 3/2006 | Moughabghab et al. | ..... 375/232 |
| 2007/0047127 A1 | * | 3/2007 | Hutchins et al. | .............. 360/65 |

* cited by examiner

*Primary Examiner*—Chieh M. Fan
*Assistant Examiner*—Sudhanshu C. Pathak
(74) *Attorney, Agent, or Firm*—Michael A. Rahman

(57) ABSTRACT

A system and method for enhancing the dynamic range of a receiver without degrading the signal to noise ratio of an incoming signal is disclosed. In one embodiment, an enhanced dynamic range receiver for receiving an incoming signal and processing the incoming signal comprises a plurality of VGAs alternately connected in series with a plurality of equalizers to form a VGA-equalizer chain, the VGA-equalizer chain adapted to receive the incoming signal and operable to generate a first analog signal, a first PD adapted to receive the first analog signal and operable to adjust the equalizers' coefficient values, and a second PD adapted to receive a second analog signal from a selected node in the VGA-equalizer chain and operable to adjust the gain of the VGAs.

33 Claims, 7 Drawing Sheets

DYNAMIC RANGE SIGNAL TO NOISE OPTIMIZATION SYSTEM AND METHOD FOR RECEIVER

TECHNICAL FIELD

The present invention relates generally to digital communications, and more specifically to a dynamic range signal to noise optimization system and method for a receiver.

BACKGROUND OF THE INVENTION

In communication systems, data (or signal) is transferred by a transmitter over a physical media such as, for example, coaxial cable, twisted pair, or optical fiber. These physical media are non-ideal communication channels, which degrades the signal by causing attenuation and delay. The physical media also degrades the signal by adding noise and distortion to the signal. The degradation of the signal reduces the signal to noise ratio (SNR) of the signal. The reduced SNR decreases the dynamic range of a receiver, which receives the signal from the physical media.

Referring now to FIG. 1, a receiver 100 includes a variable gain amplifier (VGA) 104, an equalizer 108, a peak detector (PD) 116, a slicer 140, an analog offset controller (AOC) 112, a clock and data recovery circuit (CDR) 120, an automatic equalizer control (AEC) 124, an analog gain controller (AGC) 128, and a digital decoder 132. In the following description, the physical media will simply be referred to as a cable although the invention is applicable to other physical media as well.

The signal is transmitted over a cable 102, and the signal is then received by the receiver 100. The VGA 104 amplifies the signal to compensate for the frequency-independent loss, also known as resistive loss or flat loss.

The output of the VGA 104 is received by the equalizer 108. The equalizer 108 compensates for the frequency-dependent loss on the cable also known as cable loss. The equalizer 108 boosts the high frequency components of the signal to compensate for the cable loss.

The output of the equalizer 108 is received by the PD 116. In general, the PD 116, which receives an analog output from the equalizer 108, determines the peak of the equalized signal. The output of the equalizer 108 is also received by the AOC 112, which controls through the VGA 104 the differential offset of the receiver. Thus, the AOC 112 forms a feedback loop to adjust through the VGA 104 the differential offset of the receiver, driving the differential offset to 0 V level. The differential offset of the receiver is driven to a 0 V level in order to eliminate harmonic distortion inside the receiver 100.

As discussed before, the output of the equalizer 108 is received by the PD 116. The peak detector determines the peak of the equalized signal (i.e., the output of the equalizer 108) and sends the peak value to the slicer 140. The slicer 140 also receives the output of the equalizer 108. The slicer 140 functions as an analog to digital converter (e.g., a 2 bit A/D converter), which outputs a digital signal using the peak value.

The digital output of the slicer 140 is received by the CDR 120. The CDR 120 extracts the correct clock signal and data from the digital signal and also synchronizes the data and the clock signal. The output of the CDR 120 is received by the decoder 132, which decodes the signal according to a standard decoding scheme.

The analog output of the PD 116 is received by the AGC 128, which controls the gain of the VGA 104. The digital output of the slicer 140 and the output of the CDR 120 are received by the AEC 124, which controls the gain of the equalizer 108 by adjusting the equalizer coefficients or steps.

A signal, such as, for example, a digital signal (i.e., data) can be decomposed into a set of sinusoidal waves according to the Fourier theorem, each sinusoidal wave having a different frequency and amplitude. As discussed before, when a signal such as a sinusoidal wave travels over a cable, which is a non-ideal communication channel, it suffers from attenuation. The attenuation refers to the loss or decrease in amplitude of the signal. The sinusoidal wave is also subjected to a delay when traveling through the cable. The delay varies depending on the frequencies. Thus, the sinusoidal waves that form a digital signal will each be delayed by a varying degree. In general, the sinusoidal wave's attenuation and delay is directly proportional to the transmission distance. Thus, the longer the sinusoidal wave travels, the more attenuation and delay it suffers.

FIG. 2 illustrates the attenuation and delay of a square wave that travels through a 100 feet cable and a 1000 feet cable, respectively. As shown in FIG. 2, the square wave's attenuation and delay increase as the wave travels longer distance.

A signal traveling through a cable suffers two types of loss: (a) frequency dependent loss (i.e., cable loss); and (b) frequency independent (i.e., resistive loss or flat loss). A flat loss causes all frequencies of the signal to be attenuated by the same level. A cable loss causes different levels of attenuation to different frequencies. In general, a cable causes higher level of attenuation to high frequency signals and lower levels of attenuation to low frequency signals. Thus, when a square wave travels through a cable, its higher frequencies are attenuated more than lower frequencies. The cable also adds noise and distortion to the signal, which causes degradation of the signal.

In general, the receiver 100 (also known as an analog front-end receiver) is relied upon to restore transmitted signals after they travel through the cable. As shown in FIG. 1, the receiver 100 provides analog gain compensation, equalization and filtering. The equalizer 108 compensates for the frequency-dependent loss on the cable. The equalizer 108 is a combination of several blocks, each block having a low pass filter and an adjustable zero. The low pass filter is implemented with a fixed pole. In a typical equalizer, an all 0 code corresponds to a scenario when the pole and zero of each block are aligned and their individual effects are cancelled. When the equalizer coefficient is increased, the zero location moves towards lower frequency, resulting in a high pass function. The purpose of the equalizer is to create a high-pass function that is inverse of the low pass function of the cable, so that the combined frequency response of the cable and the equalizer is 0 dB (i.e., flat).

Ideal Equalization

FIGS. 3(a) and 3(b) illustrate an ideal equalization scheme, which restores a signal to its original state. In FIG. 3(a), the signal originates from a transmitter 304, travels through a cable 308, and is received by a receiver 312. The signal is subjected to cable loss as it travels through the cable 308. FIG. 3(a) shows that the original waveform is attenuated due to cable loss and is then restored or equalized by an equalizer inside the receiver 312.

FIG. 3(b) illustrates the cable loss characteristics, the equalization frequency response, and the overall transfer function. The cable loss characteristics indicate attenuation of the high frequency components of the signal due to the low pass characteristics. The equalizer is adjusted so that the high frequency components of the signal are amplified, thereby canceling the cable loss effect and restoring the signal to its original state. The overall transfer function after the equalization is the 0 dB line.

In reality, however, the equalizer doesn't completely cancel the effect of the cable loss on a signal. The equalizer either under equalizes or over equalizes.

Under Equalization

If the equalizer's high frequency boost is inadequate to cancel the loss caused by the cable, the resulting signal will be under equalized. An under equalized signal is not fully restored to its original form. FIGS. 4(a) and 4(b) illustrate an under equalization scenario. In FIG. 4(a), a signal originating from a transmitter 404 travels over a cable 408 and is subjected to cable loss. The cable loss causes attenuation of the high frequency contents of the signal. An equalizer inside the receiver 412 attempts to restore the signal to its original shape. However, as shown in FIG. 4(a), the equalizer's high frequency boost is inadequate to restore the attenuation due to the cable loss. Thus, the signal after equalization is under equalized. FIG. 4(b) shows the equalization frequency response, cable loss characteristics and overall transfer function. Due to inadequate equalization, the transfer function indicates that the high frequency components are not completely restored.

Over-Equalization

If the equalizer provides more high frequency boost than necessary to cancel the cable loss, the resulting signal is over equalized. An over equalized signal contains ringing. FIGS. 5(a) and 5(b) illustrate an over equalization scenario.

In FIG. 5(a), a signal originating from a transmitter 504 travels over a cable 508 and is subjected to cable loss. The cable loss causes attenuation of the high frequency contents of the signal. An equalizer inside a receiver 512 attempts to restore the signal to its original shape. However, as shown in FIG. 5(a), the equalizer provides excess high frequency boost, which causes a ringing waveform.

FIG. 5(b) shows the equalization frequency response, cable loss characteristics and overall transfer function. Due to excessive equalization, the transfer function indicates that the resulting signal includes excessive high frequency boost, thus resulting in a ringing waveform.

Both under equalized and over equalized signals are undesirable in communication systems. An over equalized signal causes error in a peak detector, resulting in bit errors. An under equalized signal causes inter-symbol-interference (ISI). The problems caused by under equalization and over equalization will be discussed further below.

FIGS. 6(a)-6(c) illustrate the problems due to over equalization. In FIG. 6(a), the original signal consists of 0, 1, 0, −1. FIG. 6(b) illustrates the resulting signal after over equalization. Due to over equalization, the signal contains significant ringing. FIG. 6(c) illustrates the signal after being processed by a peak detector. The output of the peak detector is an incorrectly restored signal consisting of 1, 0, 1, −1, 0, 1, −1, 0, −1, 1.

FIGS. 7(a)-7(c) illustrate the problem due to under equalization. In FIG. 7(a), the original signal consists of 0, 1, 0, −1. FIG. 7(b) illustrates the resulting signal after under equalization. FIG. 7(c) illustrates the waveform after being processed by a peak detector. The output of the peak detector consists of 1, 0, −1, 0. Thus, the output of the peak detector contains significant error.

Dynamic Range of a Receiver

The dynamic range of the receiver 100 is related to the receiver reach. The receiver reach is defined as the maximum cable length over which the signal can travel and yet remains within acceptable bit error degradation. A large dynamic range of the receiver provides a large receiver reach. As discussed before, when a signal travels a large distance, it suffers from attenuation and delay. The attenuation and delay causes bit error at the output of the slicer 140, thereby having a negative effect on the receiver reach.

As shown in FIG. 1, the AGC 128 receives the output of the PD 116. The signal processed by the PD 116 has already been compensated by the VGA 104 for flat loss and by the equalizer 108 for cable loss. The equalizer 108 compensates for the frequency dependent loss in the cable due to the non-ideal characteristics of the cable. The equalizer 108 boosts the high frequency components of the signal. However, the high frequency boost applied by the equalizer 108 also increases the amplitude of the signal. The AEC 124 controls the equalizer steps or coefficient values. When there is a high cable loss, the equalizer coefficient values are set to a high value to provide large high frequency boost. The large high frequency boost increases the amplitude of the signal, which is processed by the PD 116 and subsequently received by the AGC 128. Since the signal received by the AGC 128 has high amplitude, the AGC 128 decreases the gain of the VGA 104.

If the VGA's gain is decreased significantly, the signal to noise ratio (SNR) at the input of the equalizer 108 is reduced, thus degrading the signal quality. A degradation of the SNR limits the receiver's ability to recover signals over a long cable length, thereby reducing the dynamic range of the receiver. Also, the addition of the flat loss to the cable loss causes the AGC to inadequately compensate for the flat loss due to the large high frequency boost of the equalizer, thus degrading the SNR further.

Accordingly, there is a need for a receiver with an enhanced dynamic range. There is a need for an equalization method and system that compensate for the cable loss without degrading the SNR of a signal.

SUMMARY OF THE INVENTION

The present invention is directed to a system and method for enhancing the dynamic range of a receiver without degrading the signal to noise ratio of an incoming signal. In one embodiment, an enhanced dynamic range receiver for receiving an incoming signal and processing the incoming signal comprises a plurality of VGAs alternately connected in series with a plurality of equalizers to form a VGA-equalizer chain and adapted to receive the incoming signal, the VGA-equalizer chain operable to generate a first analog signal, a first PD adapted to receive the first analog signal and operable responsive to the first analog signal to generate a first peak value, a second PD adapted to receive a second analog signal at a selected node in the VGA-equalizer chain and operable responsive to the second analog signal to generate a second peak value, a slicer adapted to receive the first analog signal and the first peak value and operable to generate a first digital signal, a CDR circuit adapted to receive the first digital signal and operable to generate a data and a clock signal, an equalizer control circuit adapted to receive the first digital signal and the clock signal and operable responsive to the first digital signal and the clock signal to vary the equalizers' coefficient values, and a gain control circuit adapted to receive the second peak value and operable responsive to the second peak value to vary the gain of the VGAs. The equalizers' coefficient values are adjusted to provide equalization to compensate for the incoming signal's cable loss. The VGAs' gain is adjusted to compensate the incoming signal's frequency independent loss without degrading the SNR of the incoming signal.

The receiver further comprises a multiplexer coupled to the second PD and adapted to select one of plurality of the nodes in the VGA-equalizer chain as the selected node. The receiver further comprises a digital decoder adapted to receive the clock signal and the data from the CDR and operable to decode the data. The receiver further comprises an analog offset control circuit adapted to receive the first analog signal and operable to adjust the offset voltage of the receiver to a predetermined level.

DETAILED DESCRIPTION OF THE INVENTION

The invention provides a receiver architecture with an enhanced dynamic range. The invention provides an equalization system and method that compensate for high cable loss without degrading the SNR of the signal.

Figure 1:
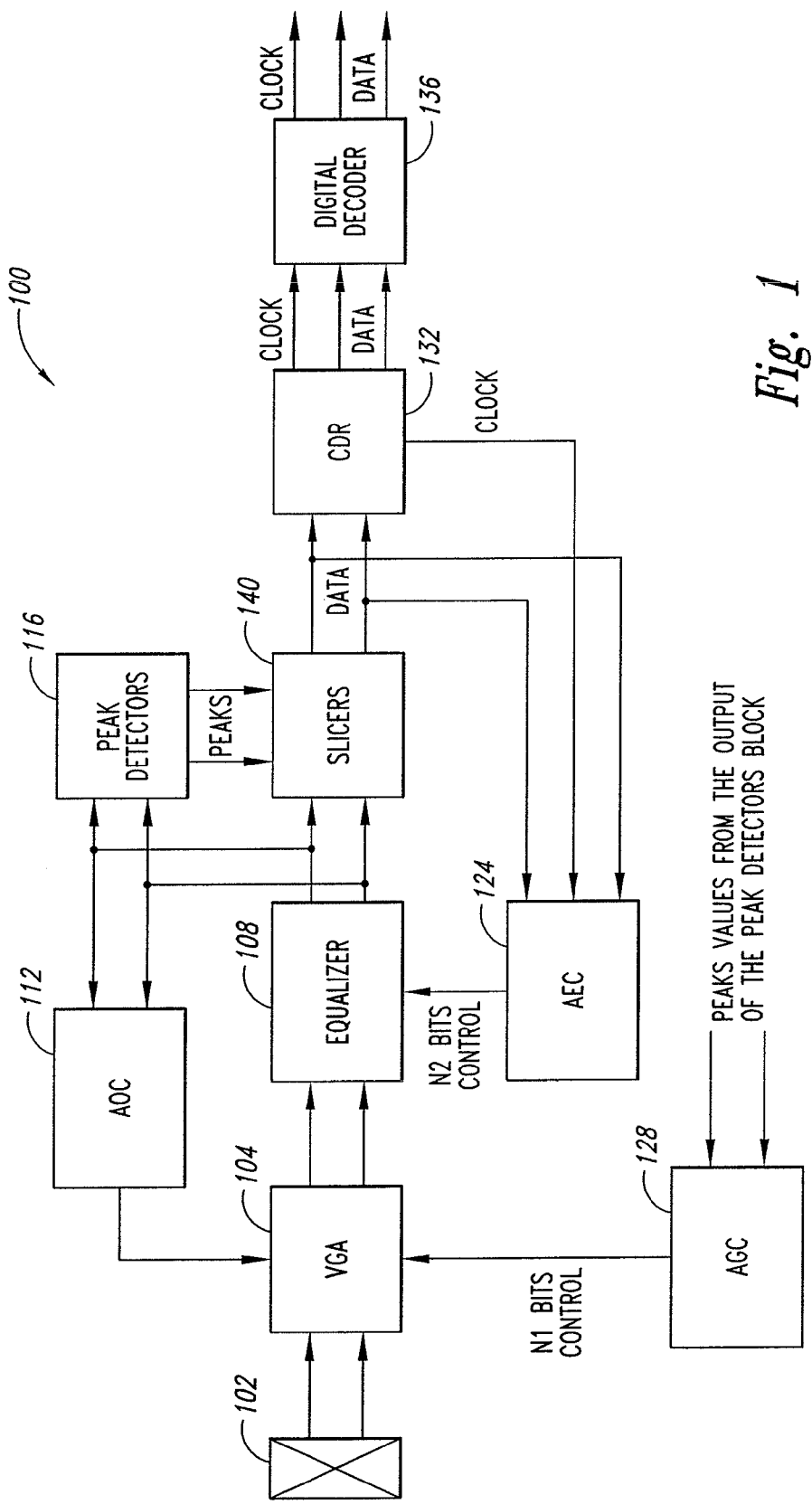
FIG. 1 illustrates a conventional receiver.
Figure 2:
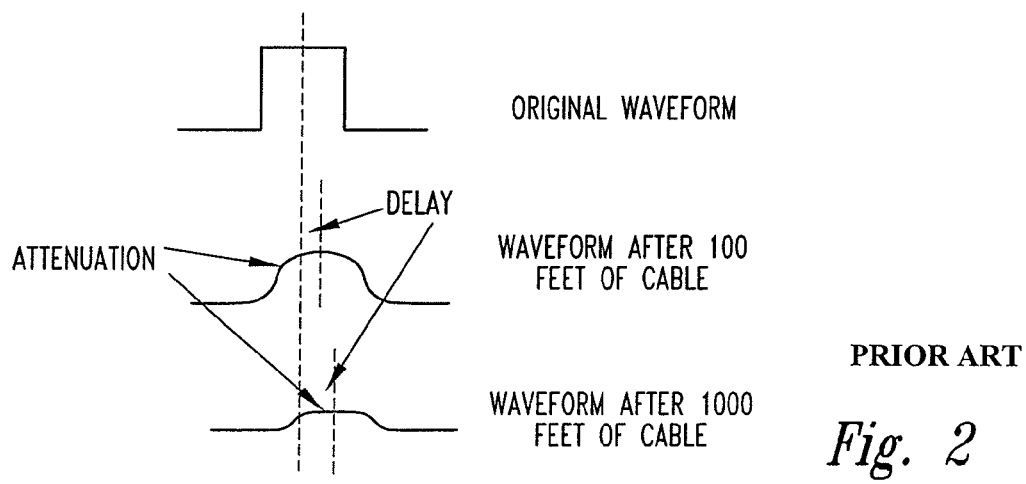
FIG. 2 illustrates the attenuation and delay of a square wave.
Figure 3A:
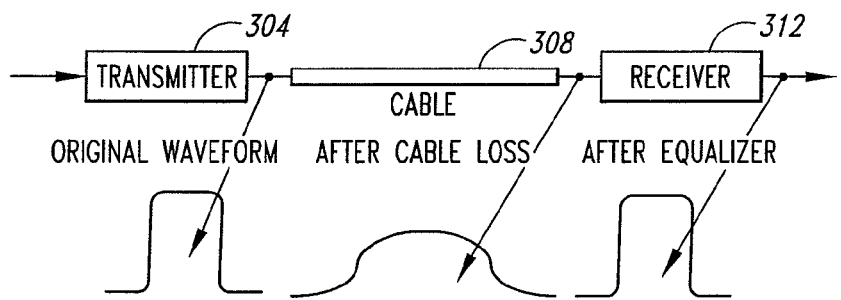
FIGS. 3(a) and 3(b) illustrate an ideal equalization scenario.
Figure 3B:
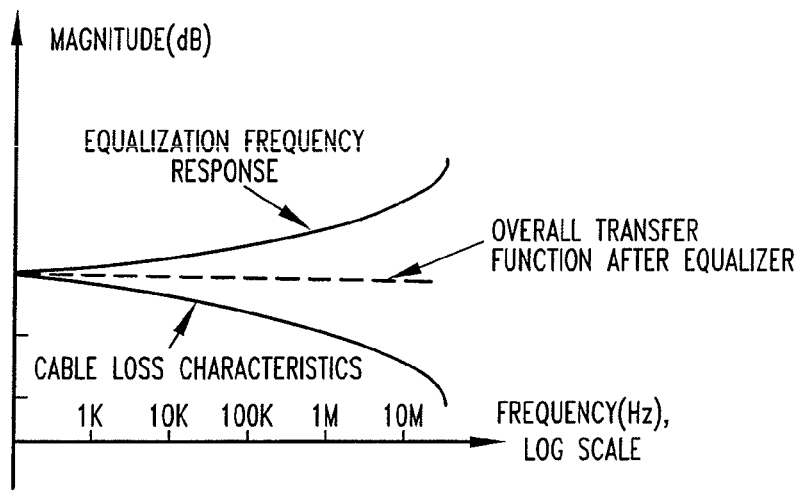
Figure 4A:
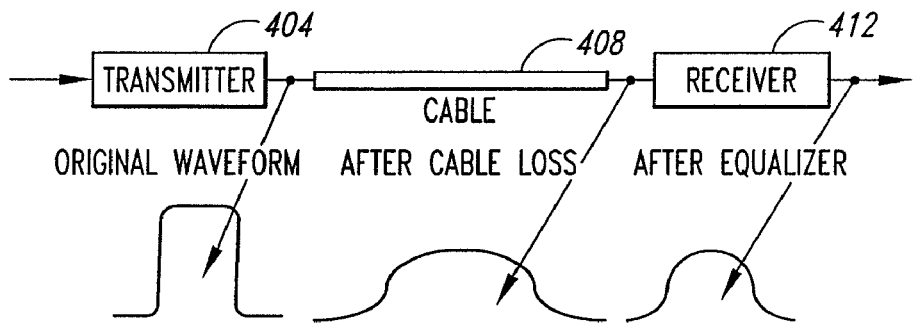
FIGS. 4(a) and 4(b) illustrate an under equalization scenario.
Figure 4B:
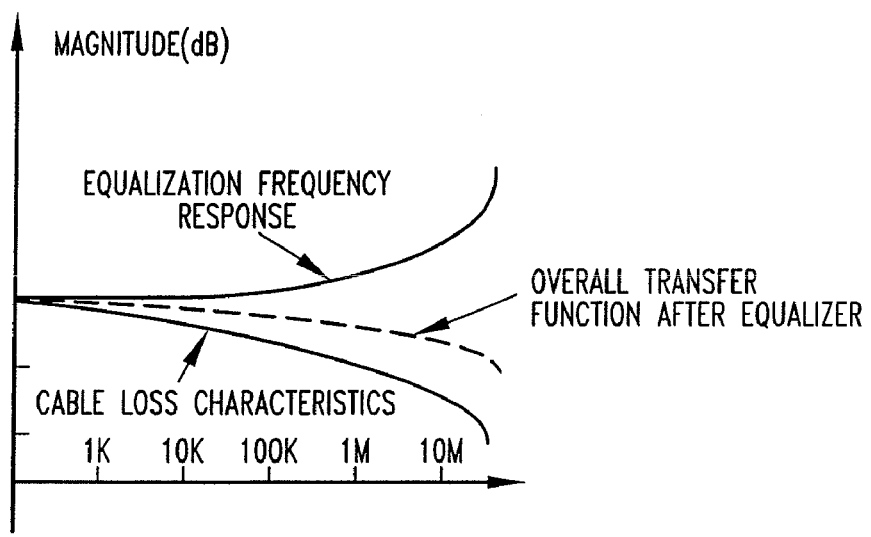
Figure 5A:
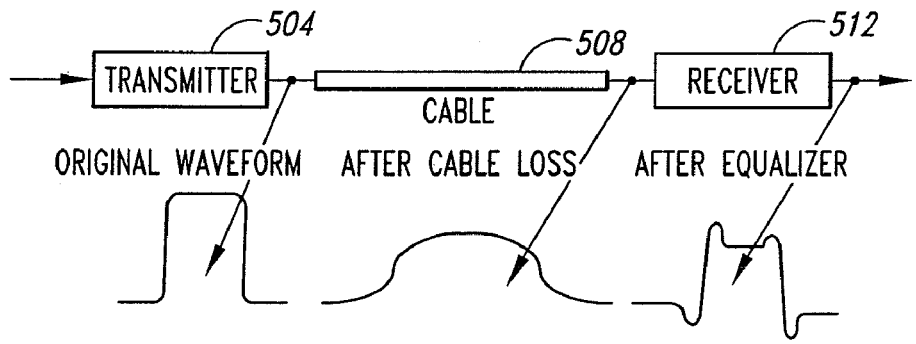
FIGS. 5(a) and 5(b) illustrate an over equalization scenario
Figure 5B:
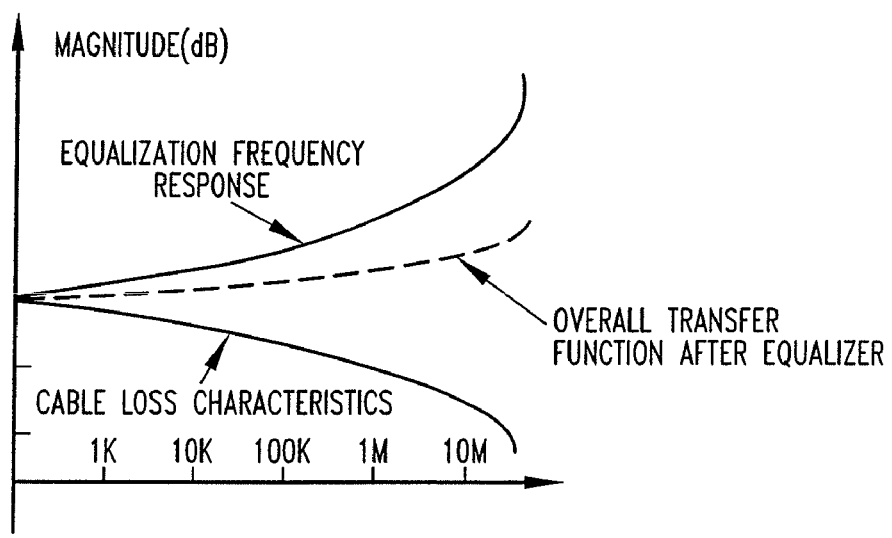
Figure 6A:
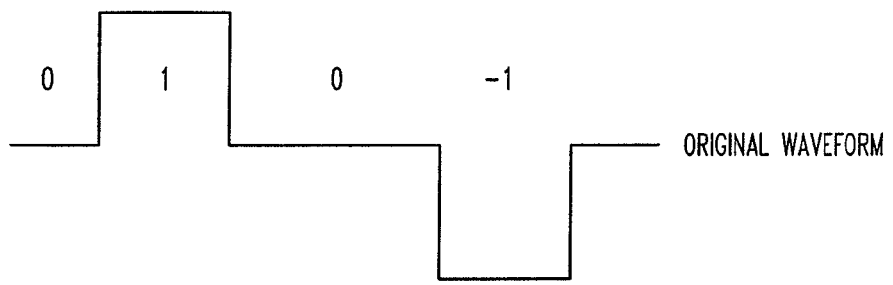
FIGS. 6(a)-6(c) illustrate problems due to over equalization.
Figure 6B:
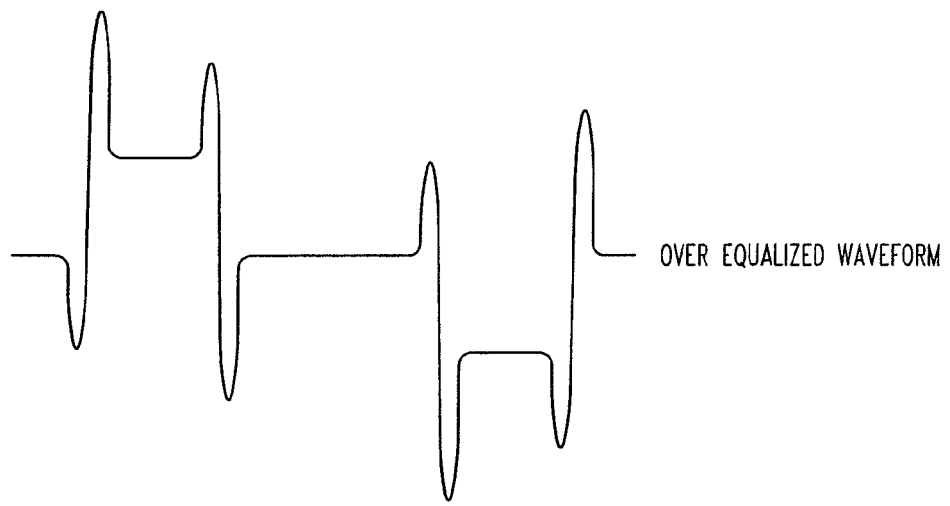
Figure 6C:
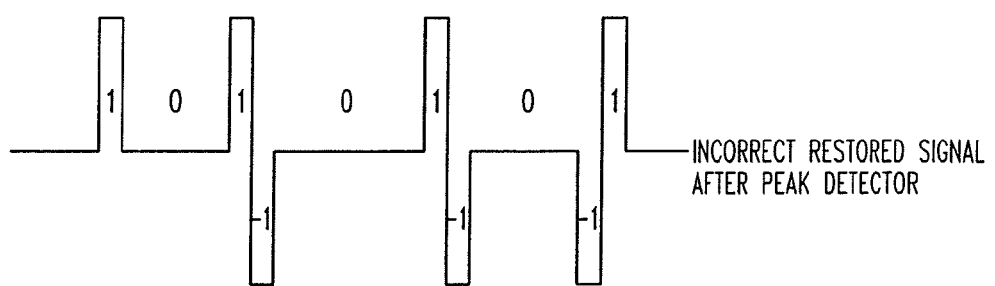
Figure 7A:
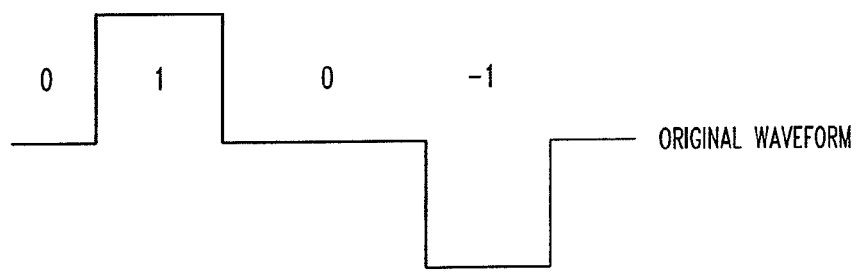
FIGS. 7(a)-7(c) illustrate problems due to under equalization.
Figure 7B:
Figure 7C:
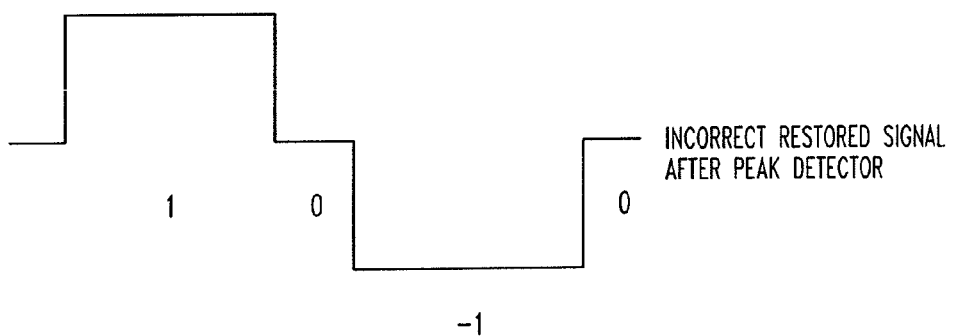
Figure 8:
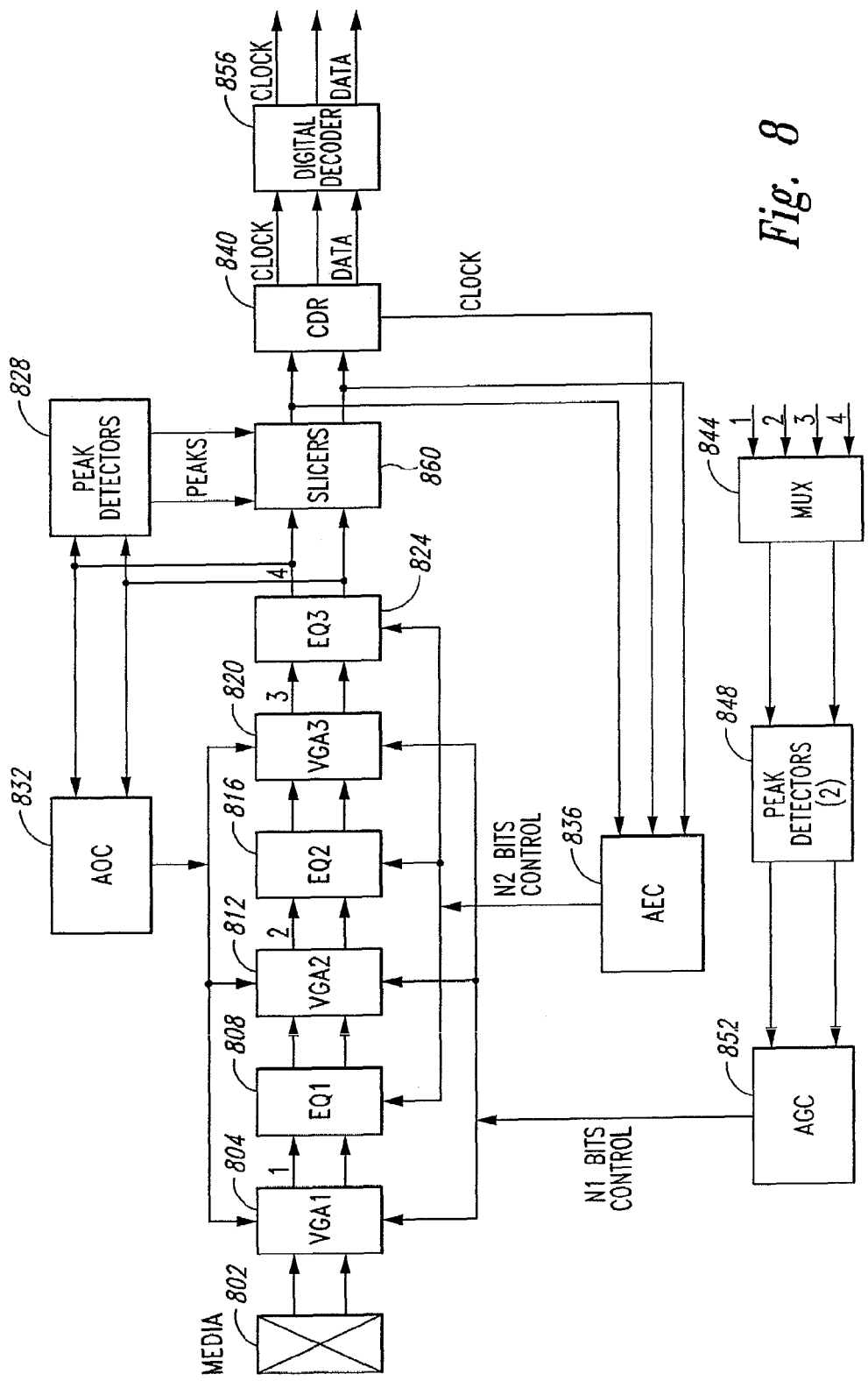
FIG. 8 illustrates a receiver in accordance with an embodiment of the invention.

FIG. 8 illustrates a receiver 800 in accordance with an embodiment of the invention. The receiver 800 includes VGAs 804, 812, 820, equalizers 808, 816, 824, a PD 828, an AOC 832, an AEC 836, a CDR 840, a multiplexer 844, a PD 848, an AGC 852, a digital decoder 856, and a slicer 860. The receiver receives an incoming signal transmitted over a cable 802.

As shown in FIG. 8, the VGAs 804, 812, 820 and the equalizers 808, 816, 824 are alternately connected in series to form a VGA/equalizer chain. The invention utilizes two independent PDs 828 and 848. The PD 828 receives the equalized signal at the end of the VGA/equalizer path and determines the peak value of the equalized signal. The PD 828 determines the peak value of the equalized signal and sends the peak value to the slicer 860. The slicer 860 also receives the equalized signal. The slicer 860 converts the equalized signal to a digital signal using the peak value. The output of the slicer 860 is used to control the equalizers' coefficient value through the AEC 836. The PD 848 controls the gain of the VGAs. The AOC 832 receives the equalized signal and regulates the analog offset voltage of the receiver. In one embodiment, the analog offset voltage of the receiver is driven to a zero volt.

In one embodiment, the PD 848 receives a control input from one of several nodes inside the receiver 800. A multiplexer 844 taps the voltage at one of four different nodes inside the receiver 800 and feeds the tapped voltage to the PD 848: The nodes are designated as node 1-node 4. The node that provides the highest SNR is selected.

Node 1 is the output of the VGA 804. Node 2 is the output of the VGA 812, which is preceded by the equalizer 808. Node 3 is the output of the VGA 820, which is preceded by the equalizer 816. Node 4 is the output of the equalizer 824, which coincides with the end of the VGA/equalizer chain and is the same node at which the AOC 832 taps the signal to adjust the offset of the receiver 800.

Node 1 has lower gain than the signal at node 2 because node 1 only includes the gain resulting from the operation of the VGA 804 while node 2 includes the gain resulting from the operation of the VGAs 804, 812 and the equalizer 808. Likewise, node 2 has lower gain than node 3, and node 3 has lower gain than node 4. Thus if node 1 is selected by the multiplexer 844, the AGC 852 sets the gain of the VGAs to a higher level to increase the signal's amplitude to compensate for the flat loss. If node 2 is selected by the multiplexer 844, the AGC 852 sets the VGAs gain to a lower level than if node 1 was selected.

The VGAs and the equalizers do not receive feedback signals from the same PDs. Since the VGAs and the equalizers are controlled by separate feedback signals from independent PDs,—the VGAs gain is set at an optimum level independent from the equalizer's coefficient values, i.e., equalizer setting. As discussed before, the equalizer's boost level is controlled by the AEC by adjusting the equalizer's coefficient values. In a conventional receiver architecture, when the equalizer provides a high boost to compensate for a large cable loss, the equalizer also indirectly increases the amplitude of the signal. Faced with a signal having a large amplitude, the AGC decreases the VGA's gain level, resulting in a degradation of the receiver's SNR. In the present invention, the AGC and the AEC receive input signals from independent PDs. By providing input signals from independent PDs, the VGAs and the equalizers are optimized independently. In other words, the boost level of the VGAs and the equalizers are adjusted independently of one another, which improves the SNR of the receiver. In the receiver 800, the VGA will always be set to a higher value compared to a conventional receiver because the VGAs will not be improperly influenced by the equalizer's boost. Since the VGAs provide a higher level of boost, the noise immunity of the receiver 800 is improved, i.e., the SNR is higher.

As discussed before, the VGAs 804, 812, 820 are alternately placed in series with the equalizers 808, 816, 824. Each VGA provides only a fraction of the total gain required to compensate for the flat loss in the incoming signal. The total gain provided by the receiver 800 is equal to the sum of the gain of all the VGAs. Similarly, each equalizer provides only a fraction of the total high frequency boost required to compensate for the cable loss in the incoming signal. The total high frequency boost provided by the receiver 800 is equal to the sum of the boost of all the equalizers.

In operation, an incoming signal is processed alternately by the VGAs and the equalizers as shown in FIG. 8. Consider, for example, a scenario where the incoming signal travels over a long cable and consequently has a large cable loss, i.e., small voltage amplitude. Since the signal voltage amplitude is small due to the large cable loss, the AGC 852 adjusts the gain of the VGAs 804, 812, 820 to a high level. However, since each VGA only provides a fraction of the total gain, the input signal at each equalizer only contains the gain provided by the preceding VGA. Each equalizer only provides an amount of equalization based on the signal that the equalizer receives. Thus, the amount of equalization provided by the individual equalizers will vary. Also, the PD 848 receives an input signal that is independent of the equalizers. Thus, the AGC 852, which receives its input from the PD 848, adjusts the gain of the VGAs independent of the equalizers. Consequently, a high level of equalization by the equalizers do not cause the AGC 852 to adjust the gain of the VGAs to a low level.

Although the receiver 800 is shown to include three VGAs and three equalizers alternately connected in series, the invention can be modified to include higher number of VGAs and equalizers. In one embodiment, the receiver 800 can be modified to include n number of VGAs and n number of equalizers.

Although the receiver 800 is shown to include a multiplexer 844 with 4 inputs, the invention can be modified to include higher number of multiplexer inputs. In one embodiment, the receiver 800 can be modified to include n number of multiplexer inputs.

A comparison between the receiver architecture of FIG. 8 and a conventional receiver indicates that the receiver of FIG. 8 provides approximately 30% more receiver reach. For example, the receiver of FIG. 8 provides 2600 feet of receiver reach, while a conventional receiver provides only 2000 feet of receiver reach.

What is claimed is:

1. An enhanced dynamic range receiver for receiving an incoming signal and processing the incoming signal, the receiver having an equalization capability without degrading the signal to noise ratio (SNR) of the signal, comprising:
   a plurality of variable gain amplifiers (VGAs) alternately connected in series with a plurality of equalizers to form a VGA-equalizer chain and adapted to receive the incoming signal, the VGA-equalizer chain operable to generate a first analog signal;
   a first peak detector (PD) adapted to receive the first analog signal and operable responsive to the first analog signal to generate a first peak value;
   a second PD adapted to receive a second analog signal at a selected node in the VGA-equalizer chain and operable responsive to the second analog signal to generate a second peak value;
   a slicer adapted to receive the first analog signal and the first peak value and operable to generate a first digital signal;
   a clock and data recovery (CDR) circuit adapted to receive the first digital signal and operable to generate a data and a clock signal;
   an equalizer control circuit adapted to receive the first digital signal and the clock signal and operable responsive to the first digital signal and the clock signal to vary the equalizers' coefficient values;
   a gain control circuit adapted to receive the second peak value and operable responsive to the second peak value to vary the gain of the VGAs.

2. The enhanced dynamic range receiver of claim 1 wherein the equalizers' coefficient values are adjusted to provide equalization to compensate for the incoming signal's cable loss.

3. The enhanced dynamic range receiver of claim 1 wherein the VGAs' gain is adjusted to compensate the incoming signal's frequency independent loss without degrading the SNR of the incoming signal.

4. The enhanced dynamic range receiver of claim 1 further comprising a multiplexer coupled to the second PD and adapted to select one of plurality of the nodes in the VGA-equalizer chain as the selected node.

5. The enhanced dynamic range receiver of claim 1 further comprising a digital decoder adapted to receive the clock signal and the data from the CDR and operable to decode the data.

6. The enhanced dynamic range receiver of claim 1 further comprising an analog offset control circuit adapted to receive the first analog signal and operable to adjust the offset voltage of the receiver to a predetermined level.

7. The enhanced dynamic range receiver of claim 1 wherein the first analog signal is the equalized signal at the end of the VGA-equalizer chain.

8. The enhanced dynamic range receiver of claim 6 wherein the offset control circuit adjusts the offset voltage to 0 volt.

9. A method for equalizing an incoming signal and enhancing the dynamic range of a receiver, comprising:
   generating a first analog signal by processing the incoming signal by an alternately connected plurality of variable gain amplifiers (VGAs) in series with a plurality of equalizers to form a VGA-equalizer chain;
   generating a first peak value from the first analog signal, the first peak value being generated by a first peak detector (PD);
   generating a second peak value from a second analog signal at a selected node in the VGA-equalizer chain, the second peak value being generated by a second PD;
   generating a first digital signal from the first analog signal and the first peak value;
   generating a data and a clock signal from the first digital signal;
   varying the equalizers' coefficient values using the first digital signal and the clock signal;
   varying the gain of the VGAs using the second peak value.

10. The method of claim 9 further comprising:
    receiving the first peak value and the first analog signal at a slicer;
    generating the first digital signal by the slicer.

11. The method of claim 9 further comprising:
    adjusting the analog offset of the receiver using the first analog signal.

12. The method of claim 9 further comprising:
    receiving the first digital signal;
    generating equalizer control signals from the first digital signal;
    varying the coefficient values of the equalizers.

13. The method of claim 12 wherein the equalizer control signals are generated by an equalizer control circuit.

14. The method of claim 12 further comprising varying the equalizers' coefficient values to compensate for the incoming signal's cable loss.

15. The method of claim 9 further comprising varying the VGAs' gain to compensate for the incoming signal's frequency independent loss.

16. The method of claim 9 further comprising:
    receiving the analog second peak value at an analog gain control circuit;
    generating a gain control signal by the analog gain control circuit;
    varying the gain of the VGAs using the gain control signal.

17. The method of claim 11 further comprising adjusting the offset voltage of the receiver by an offset control circuit adapted to receive the first analog signal.

18. The method of claim 9 further comprising selecting one of a plurality of the nodes in the VGA-equalizer chain by a multiplexer coupled to the second PD.

19. The method of claim 11 further comprising:
    receiving the first digital signal by a clock and data recovery (CDR) circuit;
    generating the clock signal and the data from the first digital signal.

20. The method of claim 19 further comprising:
    receiving the clock signal and the data;
    decoding the data.

21. The method of claim 20 wherein a digital decoder decodes the data.

22. The method of claim 11 further comprising adjusting the offset voltage of the receiver to a predetermined voltage level.

23. An enhanced dynamic range receiver for receiving an incoming signal and processing the incoming signal, the receiver having an equalization capability without degrading the signal to noise ratio (SNR) of the signal, comprising:
- a plurality of variable gain amplifiers (VGAs) alternately connected in series with a plurality of equalizers to form a VGA-equalizer chain, the VGA-equalizer chain adapted to receive the incoming signal and operable to generate a first analog signal;
- a first peak detector (PD) adapted to receive the first analog signal and operable to adjust the equalizers' coefficient values;
- a second PD adapted to receive a second analog signal from a selected node in the VGA-equalizer chain and operable to adjust the gain of the VGAs.

24. The receiver of claim 23 wherein the first PD generates a first peak value from the first analog signal.

25. The receiver of claim 23 wherein the second PD generates a second peak value from the second analog signal.

26. The receiver of claim 24 further comprising a slicer adapted to receive the first analog signal and the first peak value and operable to generate a first digital signal.

27. The receiver of claim 24 further comprising a clock and data recovery (CDR) circuit adapted to receive the first digital signal and operable to generate a clock signal and data.

28. The receiver of claim 27 further comprising an equalizer control circuit adapted to receive the first digital signal and the clock signal and operable to vary the equalizers' coefficient values.

29. The receiver of clam 28 wherein the equalizers' coefficient values are adjusted to provide equalization to compensate for the incoming signal's cable loss.

30. The receiver of claim 23 wherein the VGAs' gain is adjusted to compensate the incoming signal's frequency independent loss without degrading the SNR of the incoming signal.

31. The receiver of claim 24 further comprising a multiplexer coupled to the second PD and adapted to select one of plurality of the nodes in the VGA-equalizer chain as the selected node.

32. The receiver of claim 27 further comprising a digital decoder adapted to receive the clock signal and the data from the CDR and operable to decode the data.

33. The receiver of claim 23 further comprising an analog offset control circuit adapted to receive the first analog signal and operable to adjust the offset voltage of the receiver to a predetermined level.

* * * * *